Nov. 14, 1933.  G. C. MONCKMEIER  1,934,729
BEARING CAP FINISHING DEVICE
Filed Sept. 27, 1926  2 Sheets-Sheet 1
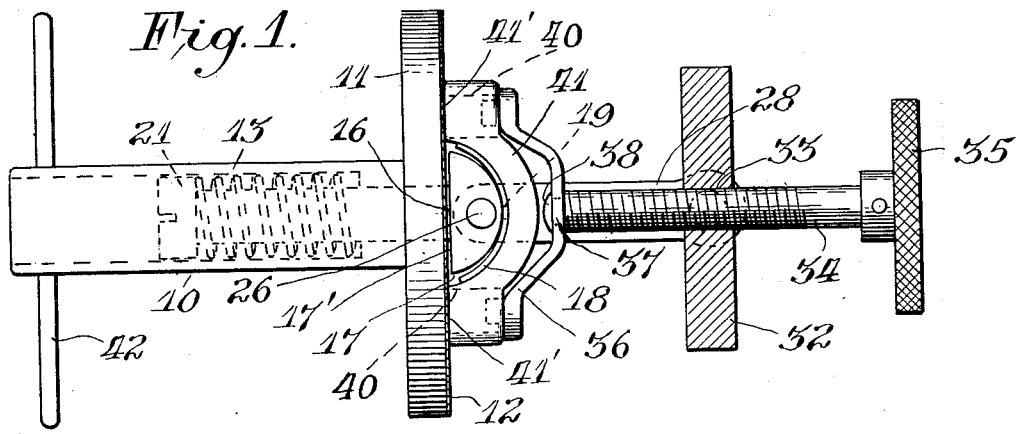
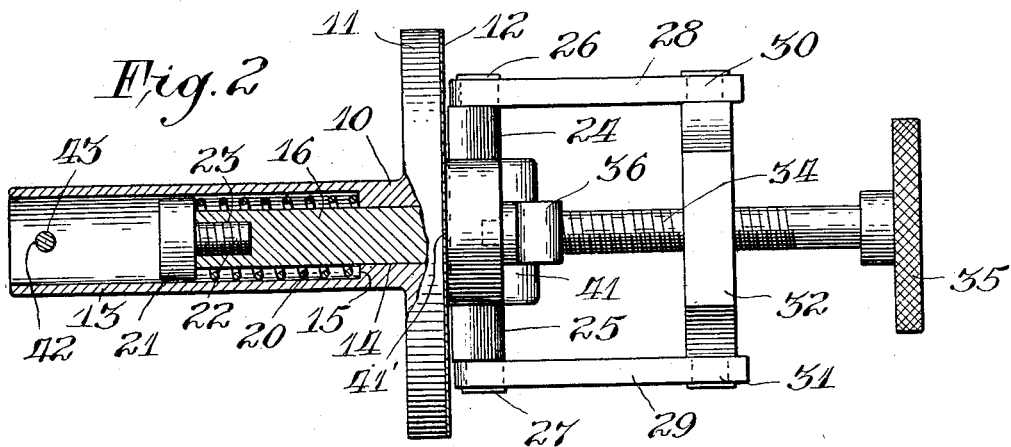
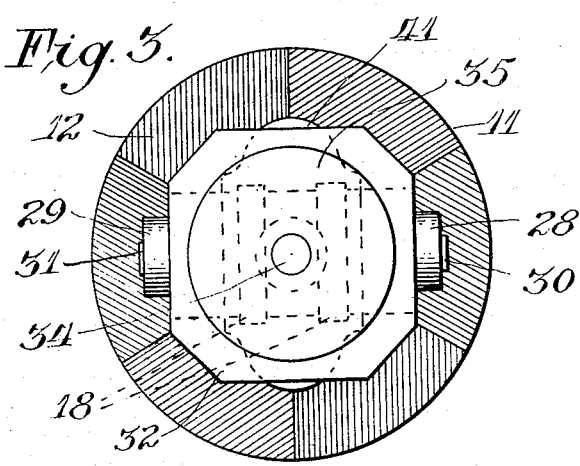
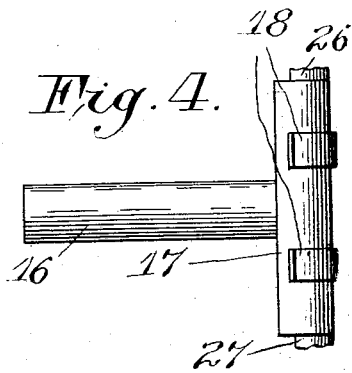
Inventor.
Gustav C. Monckmeier,
By John P. Smith
Atty.

Nov. 14, 1933.  G. C. MONCKMEIER  1,934,729
BEARING CAP FINISHING DEVICE
Filed Sept. 27, 1926   2 Sheets-Sheet 2
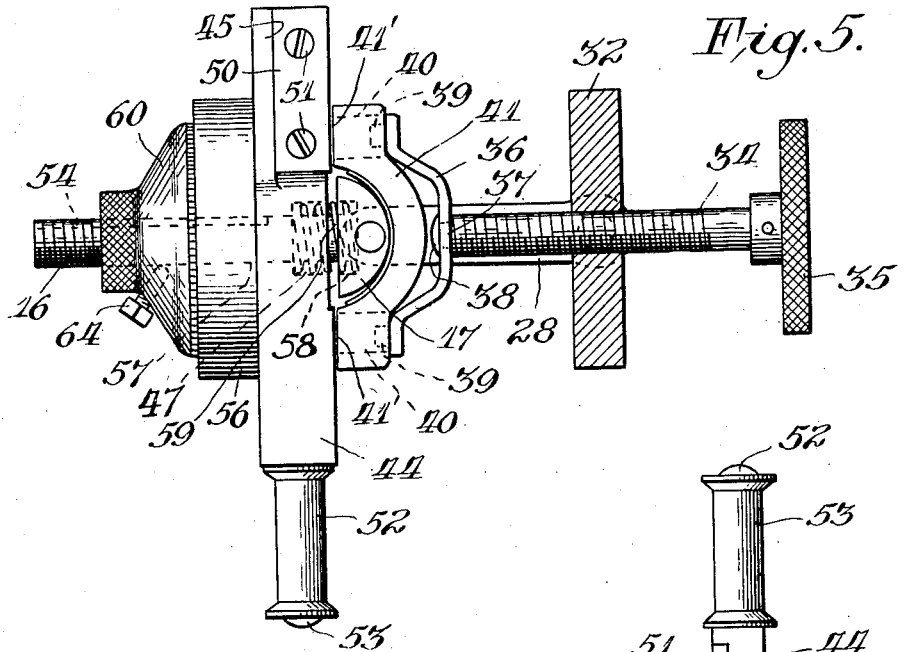
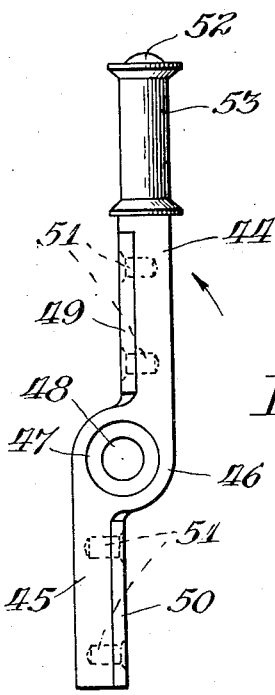
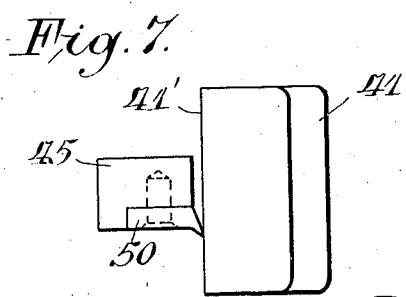
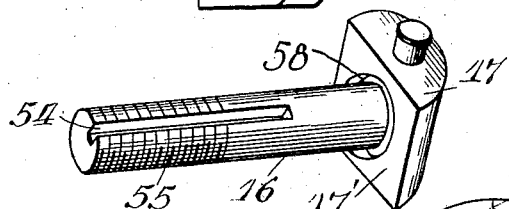
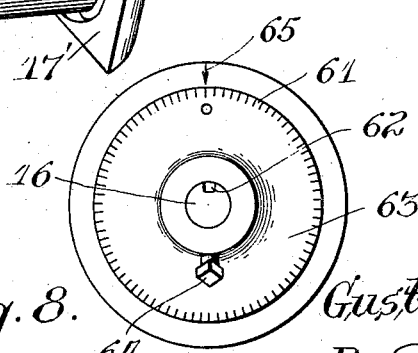
Inventor.
Gustav C. Monckmeier,
By John P. Smith
Atty.

Patented Nov. 14, 1933

1,934,729

UNITED STATES PATENT OFFICE 1,934,729

BEARING CAP FINISHING DEVICE

Gustav C. Monckmeier, Tipton, Iowa

Application September 27, 1926
Serial No. 137,869

17 Claims. (Cl. 90—12)

This invention relates to a bearing cap refinishing device and more particularly to a device for refinishing the bearing caps of piston rod connection for internal combustion engines.

One of the objects of the present invention is to provide an improved refinishing device for bearing caps which is simple in construction and efficient in operation.

A further object of the invention is to provide a novel and improved form of a refinishing device for bearing caps, in which the bearing cap is supported therein in a manner to insure an accurate refinishing or resurfacing of that portion of the cap which is secured to and comes in contact with the lower end of the piston rod connection.

A still further object of the invention is to provide a novel means for supporting and properly aligning the bearing cap with the cutting tool of the refinishing device.

A still further object of the invention is to provide a novel form of refinishing device for bearing caps which is provided with a vernier adjustment so that the same may be so adjusted that a predetermined amount of material may be cut from the bearing cap.

A further object of the invention is to provide a novel form of facing or finishing device for bearing caps in which an equalizing swivel member supports the cap thereon in such a manner that it holds the entire portion of the cap to be faced under equal pressure against the revolving cutting tool.

These and other objects are accomplished by providing construction and an arrangement of the various parts in the manner hereinafter described and particularly pointed out in the appended claims.

Referring to the drawings, Fig. 1 is a front elevational view of my improved form of bearing cap refinishing device.

Fig. 2 is a side elevational view of the same with a certain portion thereof shown in cross section.

Fig. 3 is a top plan view.

Fig. 4 is a side elevational view of one of the supporting members on which the bearing cap to be resurfaced is positioned.

Fig. 5 is a side elevational view of a modified form of my improved device for resurfacing bearing caps.

Fig. 6 is a detail top plan view of the cutting knife used in connection with the form of my invention shown in Fig. 5.

Fig. 7 is an enlarged diagrammatic view showing the relative position of the cutting knife with respect to the bearing cap, and Fig. 8 is a detail top plan view of the vernier adjustment for the form of my invention shown in Fig. 5.

Considerable difficulty has been experienced in refitting bearing caps on the lower ends of piston rod connections where it has been necessary to take up the wear on the piston rod connection bearing, in that, the common method has been to file the surfaces of the bearing cap in which case the surfaces of the bearing cap are inaccurately finished, thus giving the bearing cap an improper position with respect to piston rod connection. In this connection it will be noted that a slight variation of the surfaces of the bearing cap disaligns the bearing portion of the cap to a considerable extent and in some cases causes the upper end of the piston rod connection to bear on one side of the wrist pin, causing unnecessary wear on these parts.

It is, therefore, one of the objects of the present invention to provide an improved bearing cap surface finishing device which will accurately finish the cap in such a manner that the finished portion will bear a proper relative position to the semi-circular bearing portion of the cap, so that when the cap is secured to the lower end on the piston rod connection, these parts will assume their proper operative relation with respect to the crank shaft and wrist pin of the piston.

In illustrating one improvement of my invention I have shown the same in connection with a cutting tool 10 which is preferably provided with a disc like portion 11, on one side of which is an abrasive grinding surface 12. The cutting tool is preferably made of hard steel and is provided with a tubular extension portion 13 which is preferably formed integrally therewith. Formed within the tubular portion 13 is a bearing portion in the form of a reduced bore 14 which extends through the disc member 10. The bore 14 also forms a shoulder within the tubular extension 13 as shown at 15. Reciprocally mounted in the bearing portion 14 of the tubular extension 13 is a shank 16 of a semi-circular bearing cap engaging member or post 17. The cap engaging member 17 is provided with two spaced apart flat springs 18 which are secured to the semi-circular member or post 17 by means of rivets 19. The spaced apart springs 18 are arcuate in shape and normally occupy a larger arcuate position than the bearing portion of the cap so that the device is adapted to receive different sized bearing caps which will be properly supported thereon.

Mounted in the tubular member 13 and surrounding one end of the shank 16 is a compression spring 20, one end of which rests against the shoulder 15 and the other end of which engages the head 21 of a screw 22 which in turn is threaded into a threaded bore 23, formed in one end of the shank 16. The spring 20 normally holds the bearing cap supporting member 17 in contact with abrasive surface 12 of the tool 11. Formed integrally with the cap supporting member 17 and extending in opposite directions from each other are two bosses 24 and 25. Formed on the outer end of the bosses 24 and 25 are two laterally projecting pin extensions 26 and 27. Detachably and pivotally connected to the pins 26 and 27 are two links 28 and 29. Pivotally connected to the other ends of the links 28 and 29, as shown in 30 and 31, is a plate or frame 32. Mounted in threading engagement in a bore 33 formed centrally in the plate 32 is a hand screw 34, one end of which is provided with a hand wheel 35 and the lower end of which is provided with a swivel member 36. This swivel member 36 is journaled on the lower end of the hand screw 34 as shown at 37, by having the lower end of the screw upset as shown in 38. The outer or free ends of the swivel member 36 are provided with outwardly projecting pins 39 which are adapted to engage the opposite bores 40 of the bearing cap 41, which is shown in position in Figs. 1 and 5, to be resurfaced or finished. The outer ends of the swivel member 36 contact with or engage those portions of the bearing cap adjacent the bores 40, and through the screw 34 presses the cap against the grinding surface of the tool. The tool 11 is provided with a removable rod 42 which is adapted to extend through an aperture 43 in the tubular extension 13 and forms the handle for turning the tool for grinding the surface of the cap.

The operation of the above described device is as follows: The links 28 and 29 may be readily detached from the pins 26 and 27 and bearing cap positioned on the holder 17 after which the links 28 and 29 are connected with the pins 26 and 27 and the swivel member 36 adjusted by means of the hand screw 34 so that the lugs 39 thereof enter the apertures 40 of the bearing cap 41 and when the hand screw is further adjusted the outer ends of the swivel member 36 engages the cap and on further adjustment of the screw the flat springs 18 are compressed within the curved bearing portion of the bearing cap, thereby automatically positioning the bearing cap so that the curved bearing surface thereof is accurately positioned with respect to the grinding tool. As the springs 18 are compressed by the adjustment of the screw, the flat surface 17' of the cap holding member 17 is withdrawn from the abrading or grinding surface 12 of the tool 11 and when in this position or in position shown in Fig. 1, the plate or frame 32 may be clamped in a vise and the tool 11 revolving through the medium of the handle 42, thereby causing the grinding surface 12 of the tool to cut the surfaces 41' of the bearing cap. From this construction it will be noted that by reason of the springs 18 of the supporting member 17 engaging the curved bearing surface of the cap 41 an accurate positioning of the curved surface of the cap with respect to the grinding tool is assured and the surface thus refinished on the cap will be in a plane parallel with the axis of the curved surface of the bearing cap and thereby insure a proper resurfacing or finishing of the bearing cap so that it will assume a proper operative relation to the piston rod connection when replaced.

In the modified form of my invention, as disclosed in Figs. 5 to 9 inclusive of the drawings, I have provided a novel form of cutting member which comprises two oppositely extending arms 44 and 45 having a bearing portion 46 therebetween. The bearing portion 46 is provided with an annular socket 47 and a longitudinally extending bore 48 which is adapted to receive the shank 16 of the bearing cap supporting member 17. The oppositely extending arms 44 and 45 are provided with cutting knives 49 and 50 which in turn are secured to the respective arms by screws 51. The arm 44 is provided with an extension 52 on which is journalled a handle 53 for rotating the knife about its axis for the shank 16. The shank 16 in the modified form of my invention shown in Figs. 5 to 9 inclusive, is provided with a longitudinally extending key slot 54 and has that portion of the shank 16 adjacent to the slot threaded as shown in 55. The shank 16 extends through the bore 48 of the cutting member 46 so that the knives thereof are in position to engage the surfaces 41' of the bearing cap 41. Mounted adjacent the cutting members 44 and 45 is a disc 56 which has a bore 57 extending through the axis thereof. The supporting member 17 is provided with an annular socket 58 surrounding the shank 16. Mounted in the socket 47 of the cutting member 46 and the socket 58 of the supporting member 17 is a compression spring 59. The compression spring 59 normally presses the cutting tool 46 in a direction away from the bearing cap 41. Adjustably mounted on and in threading engagement with the threaded portion of the shank 16 is a vernier adjusting knob 60 which is provided with a plurality of vernier graduations 61. The graduations 61 are cooperatively related to the threaded shank 16 so that the knob 60 may be adjusted to a one-thousandth part of an inch, in order that an operator may remove one thousandth part of an inch or more from the surface of the cap if desired. The disc 56 is prevented from rotation with respect to the shank 16 by being provided with an inwardly extending lug or projection 62 which engages the key slot 54 in the threaded shank 16. Vernier knob 60 is secured in various positions of adjustment by set screw 64.

The operation of my modified form of bearing cap refinishing or resurfacing device is similar to the operation of the form of device illustrated in Figures 1 to 4 inclusive, except that I have provided a novel form of cutting member which is operated by revolving the knife carrying member by the handle 53 formed on one side of the same; and in addition thereto I have provided this modified form of device with a vernier adjustment which permits the tool to be adjusted so that a fractional part of an inch or more may be taken off the surface of the bearing cap according to the requirements.

When the cap is secured in position by the hand screw 34 in the manner above described, the vernier knob 60 is turned in a direction to move the cutting member and particularly the edges of the knives 49 and 50 against the unfinished surface 41' of the bearing cap 41. At this time the reading of the vernier knob 60 is observed by the operator, after which the operating handle may be turned and at intervals or simultaneously with the turning of the handle, the vernier knob 60 may be turned any predetermined few thousandths of inches at a time in a direction toward the bearing cap so that the desired amount of surface or material may be removed from the bearing cap. The amount of material removed from the surface of the bearing cap is determined by the difference between the original reading of the vernier knob and the last reading to which the vernier knob was adjusted. It being understood, of course, that the handle 53 is turned at the conclusion of each turn of the vernier knob until the knives fail to remove any additional material from the surface of the cap.

While in the above specification I have described a very simple and compact device for resurfacing that portion of the bearing cap which contacts with the piston rod connection, and in which I have illustrated and described the same as a hand operated device, it will readily be understood that the same may be mounted and so connected up as to make it power operated without necessarily departing from my invention. It will also be seen that by the construction of my improved resurfacing or refinishing device for bearing caps that I have provided a device which automatically adjusts or supports the bearing cap so that the same will be accurately positioned for refinishing the same. In other words, the resurfacing tool is located or gauged from the curved bearing surface of the cap in such a manner that the bearing cap when refinished or resurfaced bears an accurate relation to the curved portion of the bearing cap; that is, the axis of the curved surface of the bearing cap is parallel with the plane passing through the refinished surface of the bearing cap, thereby insuring an accurate fit of the bearing cap, when secured to the lower end of the piston rod connection.

It will also be noted that my improved device as shown in the modified form may be operated without the use of the adjusting nut 34' and set screw 35' by merely turning the vernier knob 60' gradually in a clockwise direction as the tool is revolved. This is continued until the desired amount of material is removed from the cap as indicated by the graduations on the vernier knob.

While I have described the operation of my finishing device as being operable by turning the tool, it will of course be understood that the tool may be held stationary and the cap and supporting parts thereof revolved, in which case the same results would be accomplished. Such a construction would be within the contemplation of my invention.

In the above specification I have described one embodiment which my invention may assume in practice, it will of course be understood that the same is capable of modification and that modification may be employed without departing from the spirit and scope of the invention as expressed in the following claims:

What I claim as my invention and desire to secure by Letters Patent is

1. A bearing cap finishing device comprising a cap supporting member, said member having a shank connected directly thereto, a rotatable tool journalled on said shank and resilient means carried by said cap supporting member for automatically positioning the curved bearing surface of the bearing cap in a position whereby the axis of the curved bearing surface of the cap is parallel to the plane of movement of said revolving tool.

2. A bearing cap finishing device comprising a cap supporting member, a revolving tool mounted on said cap supporting member, and arcuate springs mounted on said cap supporting member and engageable with the curved bearing surface of the cap for properly aligning the curved bearing surface of the cap with respect to said tool.

3. A bearing cap finishing device comprising a cap supporting member, a revolving tool mounted on said cap supporting member, two spaced apart arcuate springs mounted on said cap supporting member and engageable with the curved bearing surface of the cap for properly aligning the curved bearing surface of the cap with respect to said tool.

4. A bearing cap finishing device comprising a cap supporting member, a shank secured to and arranged at right angles to said supporting member, a revolving tool mounted on said shank, a resilient means carried by said cap supporting member and engageable with the said bearing surface of said cap for accurately aligning the cap with respect to said tool, and means engageable with the cap and connected to said cap supporting member for maintaining equal pressure on both sides of said cap in contact with said tool.

5. A bearing cap finishing device comprising a cap supporting member, a revolving tool mounted on said cap supporting member, means including two spaced apart arcuate springs engageable with the curved bearing surface of the cap for accurately aligning the cap with respect to said tool, and means engageable with said cap and connected to said cap supporting member for equalizing the pressure on both sides of the cap.

6. A bearing cap finishing device comprising a cap supporting member, having a perpendicular shaft extending from the center thereof a revolving tool mounted on said shanks and adjustable longitudinally with respect thereto, resilient means surrounding said shank for normally pressing said tool in one direction longitudinally of said cap supporting member, and means carried by said cap supporting member and engageable with the curved bearing surface of the cap for accurately aligning the cap with respect to said tool and means connected with said cap supporting member and engageable with said cap for maintaining equal pressure on both sides of said cap.

7. A bearing cap finishing device comprising a cap supporting member having a right angularly disposed shank secured thereto, a tool rotatably and reciprocally mounted on said shank, means carried by said cap supporting member and engageable with the curved bearing surface of the cap for accurately aligning the cap with respect to said tool and a vernier mounted on said cap supporting member and engageable with said tool for removing a predetermined amount of material from said cap.

8. A bearing cap finishing device comprising a cap supporting member, a tool rotatably and reciprocally mounted on said cap supporting member, a spring mounted on said cap supporting member and engageable with said tool for normally pressing said tool in one direction with respect to said cap supporting member, and means including a hand screw operatively connected with said cap supporting member and engageable with the outer ends of said cap for exerting equal pressure on said cap against said tool.

9. A bearing cap finishing device comprising a cap supporting member, a shank secured to said member, a tool rotatably mounted on said shank, means carried by said cap supporting member, and engageable with the curved bearing surface of the cap for accurately aligning the cap with respect to said tool, and means associated with said shank and tool for adjusting said device whereby a predetermined amount of material may be cut from said cap.

10. A bearing cap finishing device comprising a cap supporting member having a right angularly disposed shank, a tool rotatably and reciprocally mounted on said shank, resilient means carried by said cap supporting member and engageable with the curved bearing surface of the cap for accurately aligning the cap with respect to said tool, means connected with said cap supporting member and engageable with said cap for adjusting said cap with respect to said tool and means including a vernier adjustment operatively related to said shank, and said tool, whereby a predetermined amount of material may be cut from said cap.

11. A bearing cap finishing device comprising a cap supporting member, a tool rotatably mounted on said cap supporting member, said cap supporting member having a portion thereof mounted in the curved bearing surface of the cap for accurately aligning the cap with respect to said tool, means connected with said cap supporting member and engageable with said cap for equalizing the pressure on both ends of said cap and means adjustably connected with said cap supporting member and operatively connected with said tool whereby a predetermined amount of material may be cut from said bearing cap.

12. A bearing cap finishing device comprising a cap supporting member, a tool rotatably and reciprocally mounted on said cap supporting member, resilient means carried by said cap supporting member and engageable with the curved bearing surface of the cap for accurately aligning the cap with respect to said tool, a clamping hand screw operatively connected with said cap supporting member and having means thereon engageable with said cap and a vernier adjustment adjustably mounted on said cap supporting member and operatively connected with said tool whereby a predetermined amount of material can be cut from said cap.

13. A bearing cap finishing device comprising a cap supporting member, a tool revolvably and reciprocally mounted on said cap supporting member, a spring mounted on said cap supporting member, and engageable with said tool for normally pressing said tool in one direction longitudinally of said cap supporting member, means carried by said cap supporting member and engageable with the curved bearing surface of the cap for accurately aligning the cap with respect to said tool and means including a hand screw operatively connected with said cap supporting member and engageable with said cap for clamping the cap on said cap supporting member, a non-rotatable member mounted on said cap supporting member and engageable with said tool, said non-rotatable member being adjustable longitudinally of said cap supporting member, and means including a vernier adjustable member mounted on said cap supporting member and engageable with said non-rotating member, whereby a predetermined amount of material may be cut from said cap.

14. A bearing cap finishing device comprising a frame, a cap supporting member mounted on said frame, a revolving tool, a shank secured to said cap supporting member and extending through the axial center of said tool, and means carried by the cap supporting member and engaging the opposite sides of said cap for equally maintaining the pressure on both ends of said cap in contact with said tool.

15. A bearing cap finishing device comprising a frame, a cap supporting member mounted on said frame, a shank secured to said supporting member, a revolving tool journaled on said shank whereby the cutting surface thereof travels in a path completely engaging the surface to be finished of the cap, and a U shaped member for clamping the cap on said cap supporting member whereby the opposite ends of said cap are engaged thereby and held under equal pressure against said tool so that the amount of material removed from the finished portion of said cap is uniform.

16. A bearing cap finishing device comprising a cap supporting member including a head having convex surface for engaging the curved bearing surface of a bearing cap, a post secured to and extending at right angles to and from the lower side of said head, a cutter rotatably mounted on said post, feeding means mounted in threaded engagement with said post and adapted to engage said cutter for feeding the same, a yoke-shaped member having the arms of the yoke pivotally connected at their ends to said head, means for clamping the cap on said head including a threaded member engaged at the ends of the yoke and passing centrally through the yoke, and a U-shaped member having the arms thereof engaging the back of said bearing cap.

17. A bearing cap finishing device comprising a cap supporting member, a shank secured directly to said cap supporting member, a rotatable tool journalled on said shank, and resilient means carried by said cap supporting member and engageable with the curved bearing surface of said bearing cap for properly positioning said tool with respect to the curved bearing surface of said bearing cap.

GUSTAV C. MONCKMEIER.